United States Patent [19]

Watkinson et al.

[11] Patent Number: 5,626,217
[45] Date of Patent: May 6, 1997

[54] STACK PUSHER

[75] Inventors: Robert J. Watkinson, Long Beach; W. Vernon Smith, Tustin, both of Calif.

[73] Assignee: Excellon Automation Co., Torrance, Calif.

[21] Appl. No.: 443,722

[22] Filed: May 18, 1995

[51] Int. Cl.$^6$ ................................................. B65B 47/00
[52] U.S. Cl. ........................ 198/468.2; 269/266; 294/86.4
[58] Field of Search ........................ 198/741, 468.2, 198/473.1; 294/902, 86.4; 269/266

[56] References Cited

U.S. PATENT DOCUMENTS

| | | | |
|---|---|---|---|
| 3,140,776 | 7/1964 | Craver | 198/741 |
| 4,691,905 | 9/1987 | Tamara et al. | 269/266 |

FOREIGN PATENT DOCUMENTS

| | | | |
|---|---|---|---|
| 158244 | 3/1957 | Sweden | 269/266 |

*Primary Examiner*—Kenneth Noland
*Attorney, Agent, or Firm*—G. Donald Weber, Jr.

[57] ABSTRACT

This invention is directed to a stack pusher apparatus which is used for pushing a workpiece such as a stack of printed circuit cards between rest locations. The pusher apparatus includes an articulated engagement unit which permits reasonable tolerances relative to the dimensions of the workpiece to be pushed or moved. In addition, a pneumatically driven control mechanism for moving the stack pusher apparatus is described.

20 Claims, 2 Drawing Sheets

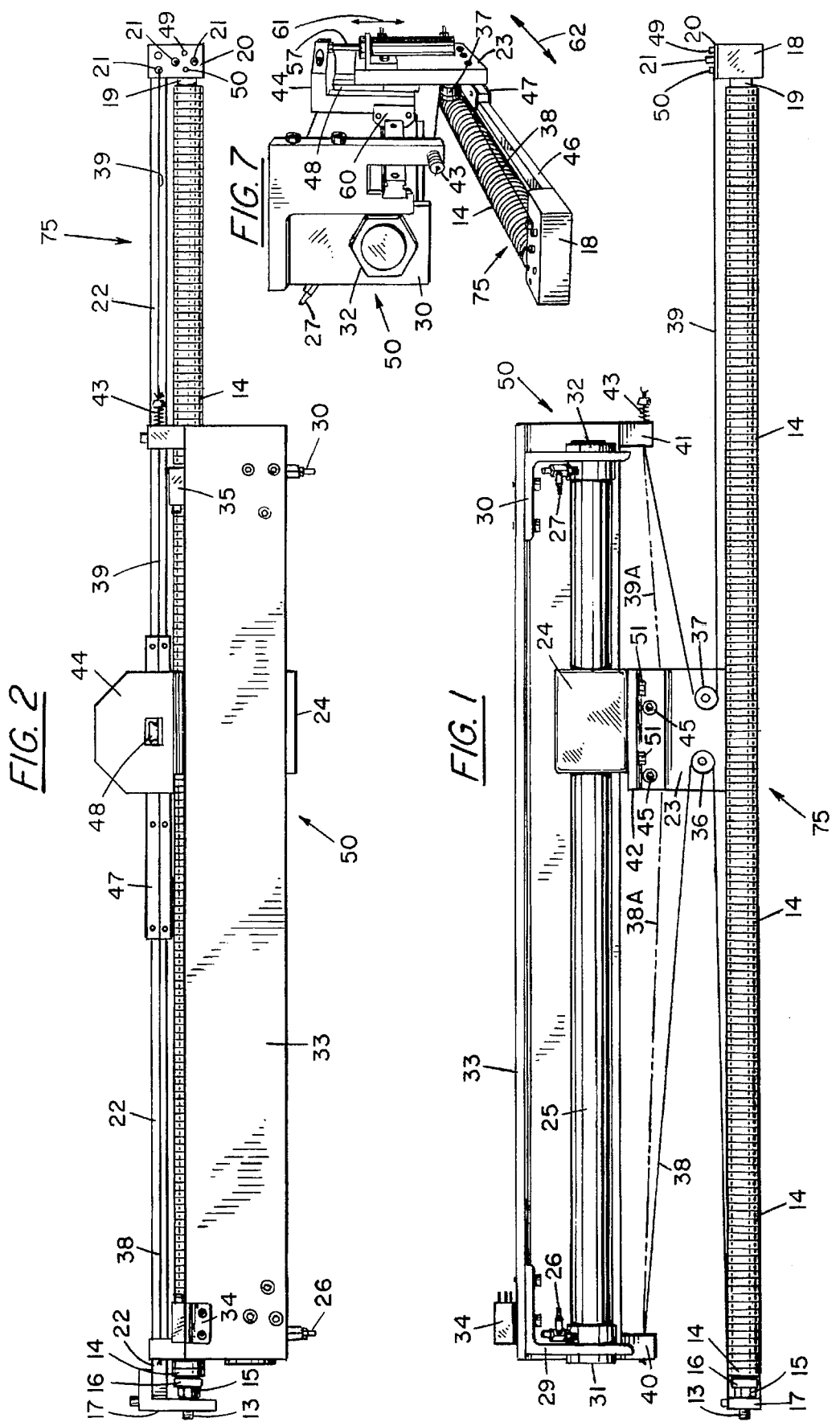

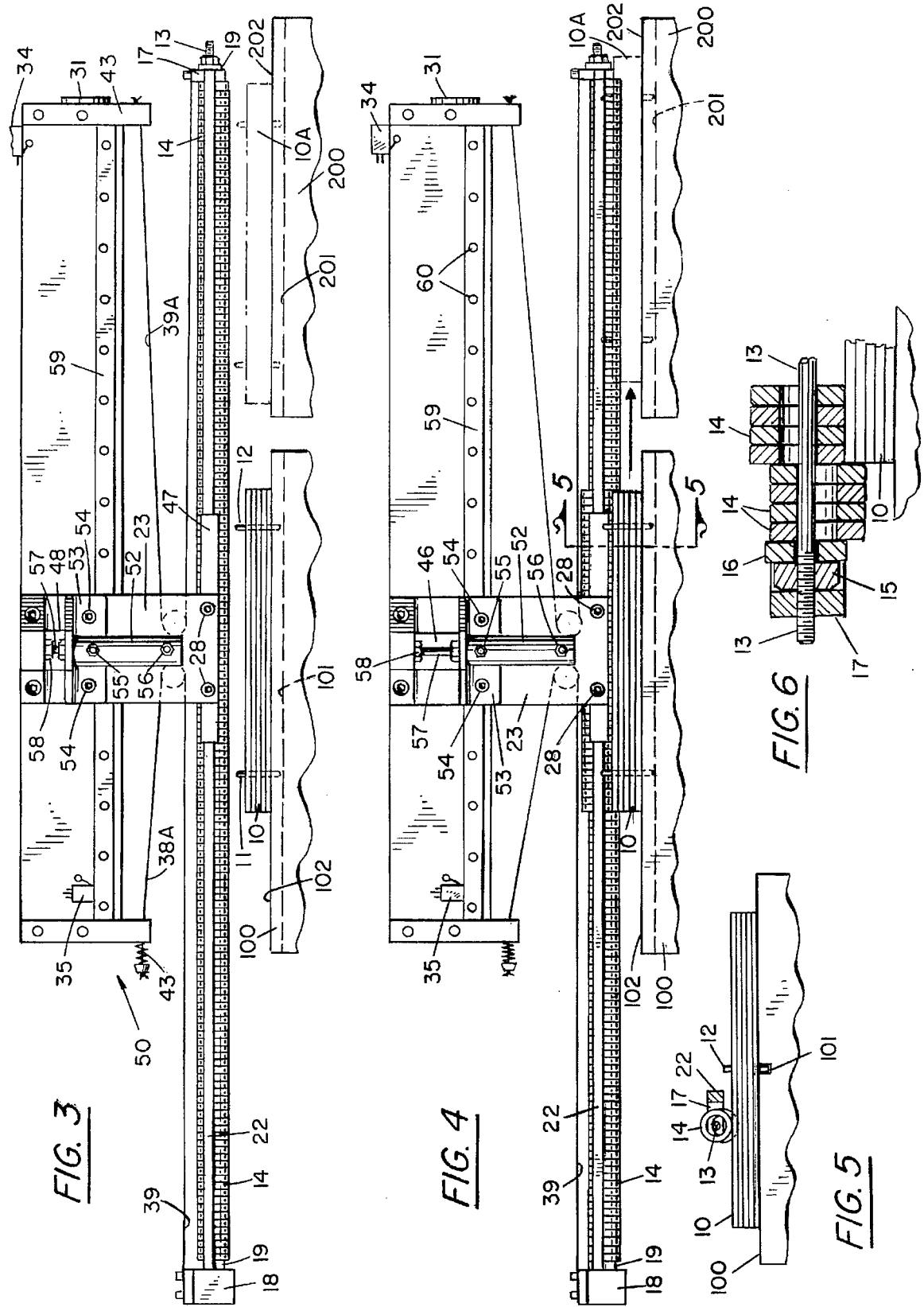

STACK PUSHER

BACKGROUND

1. Field of the Invention

This invention relates, generally, to the field of workpiece moving devices and, more particularly, to a system for moving workpieces which may have variations in dimension.

2. Prior Art

This invention relates generally to the field of precise positioning systems and, more particularly to a system for moving a workpiece from a storage location to a work station on a machine tool and vice versa.

A variety of machine tools have been designed in which the workpiece to be machined is mounted at a work station which is movable relative to the tool which is to perform the operation, e.g. machining or drilling. One such machine tool is a drilling machine which has been designed to drill holes in printed circuit boards. Typically, printed circuit boards have a large number of holes which must be drilled at precise locations in order to enable the proper mounting of electrical components on the circuit boards and/or to permit electrical connections between layers. Computer controlled drilling machines have been developed to permit mass production of circuit boards at high rates. Typically, these drilling machines have a work table (or work station) mounted on a base and movable along both axes of a horizontal plane. The printed circuit boards, or workpieces, are mounted in stacks on the worktable. Movement of the worktable in the horizontal plane positions the circuit boards beneath one or more drill spindles at the precise location where holes are desired. Drilling operations are achieved through vertical travel of the drill spindle.

In addition, to expedite and/or automate the operation, it is desirable to provide means for moving the stacks of boards from a storage area to the worktable. The storage area can be a shelf on a cart, a conveyor belt, or the like. The storage is, typically, placed in near juxtaposition to the work table prior to (and after) the operation is performed. Thus, the stacks of printed circuit boards can be readily moved between the storage areas and the work stations.

In order to expedite and/or automate the overall operation, it is desirable to provide a means for easily and accurately moving the stacks of circuit boards from a storage area to the work table and vice versa.

PRIOR ART STATEMENT

Listed herewith are a plurality of patents which have been uncovered during a preliminary patentability search. The patents are listed in patent number order, no particular evaluation is being applied thereby.

| | | |
|---|---|---|
| 5,301,938 | 5,220,997 | 4,796,500 |
| 4,727,989 | 4,422,487 | 4,342,387 |
| 3,391,658 | 1,242,738 | |

SUMMARY OF THE INVENTION

This invention is directed to a workpiece moving device referred to as a stack pusher. In particular, the pusher is capable of moving a single workpiece or a stack of such products which are pinned together. The pushing component, per se, is an articulated unit which is capable of working upon workpieces which may have somewhat different dimensions and/or positions in a storage area. Moreover, the apparatus moves the workpiece rather rapidly to avoid extensive time delays in transferring workpieces to conveyor belts adjacent to the work station or the like.

In a preferred embodiment, the pushing mechanism comprises a plurality of disks or washers mounted on a rod. The disks are maintained in close proximity to each other while retaining capability of moving individually, relative to each other, in a plane which is essentially normal to the axis of the rod.

The pusher assembly is disposed above a work station. It includes pneumatically operated components adapted for horizontal movement for pushing or moving the workpiece from one work station to another. The assembly also includes pneumatically controlled components adapted for vertical movement to permit disengagement of the stack pusher from the workpiece after the moving operation has taken place.

BRIEF DESCRIPTION OF THE DRAWINGS

FIG. 1 is a front elevational view of one embodiment of the instant invention.

FIG. 2 is a top plan view of the embodiment shown in FIG. 1.

FIG. 3 is a rear elevational view of the embodiment shown in FIG. 1 in the rest position relative to a work station.

FIG. 4 is a rear elevational view of the embodiment shown in FIG. 1 in the operative position relative to a work station.

FIG. 5 is a partial sectional view of the apparatus taken along lines 5—5 in FIG. 4.

FIG. 6 is an enlarged fragmentary view of a portion of the embodiment as shown in FIG. 1.

FIG. 7 is a perspective view of the invention taken from one end thereof.

DESCRIPTION OF A PREFERRED EMBODIMENT

Referring now to FIG. 1, there is shown a front elevational view of one embodiment of the instant invention. This embodiment includes the pusher assembly 75 and a representative support assembly 50.

The pusher assembly 75, per se, is comprised of an elongated rod 13 on which are mounted a plurality of washers or disks 14. The rod 13, which is fairly rigid, is passed through an opening in each of the washers or disks 14. Typically, the opening is centrally located in the disks. A pair of stops 16 and 19, respectively, are mounted on the opposite ends of the rod 13 in order to maintain the washers on the rod. The stop 16 can be maintained in place on rod 13 by friction fit, threaded engagement, by a set screw or any other suitable and/or desirable means. The stops 16 and 19 can be fabricated of a relatively hard rubber, plastic, metal or the like.

The stops 16 and 19 are placed on the rod 13 wherein the washers 14 are maintained in an orientation which is, generally, normal relative to the axis of rod 13. However, the washers 14 are free to move, relative to each other, in a direction normal to the axis of the rod 13.

In the embodiment shown, one end of rod 13 is threaded to receive the washer stop 16 which is threadedly attached thereto. A nut 15 is threaded onto rod 13 to restrict movement of washer stop 16. In addition, as shown in FIG. 1, the left end of the rod 13 is threadedly attached to rod end mounting bracket 17 (described infra).

At the opposite end, the rod is attached to a pneumatically expandable fitting 18. The fitting 18 is connected to pneumatic sources (not shown) via connectors 49 and 50. When pneumatic pressure is applied, fitting 18 selectively expands against washer stop 19. Washer stop 19, disposed between the disks 14 and the fitting 18, is approximately equivalent to washer stop 16 except that washer stop 19 is slidably mounted on rod 13.

Thus, when the pneumatic fitting 18 is activated by application of pressurized air thereto, washer stop 19 is forced into contact with the disks 14. The disks 14 are thereby compressed together with sufficient force so as to create a significant friction force between the disks whereby the disks barely slide relative to one another. Removal of the pneumatic pressure permits fitting 18 to relax whereby the disks are no longer forced together.

The pneumatic fitting 18 is connected to a support bracket 20 by any suitable means such as screws 21. As described infra, support bracket 20 and end bracket 17 are joined to a support shaft 22 (see FIG. 2). The support shaft 22, thus, provides the backbone support for the disk support rod 13 and the related components.

In a preferred embodiment, the carriage 24 is formed as part of a pistonless cylinder 25. The carriage 24 is arranged to move on the cylinder 25 in response to pneumatic pressure. The pneumatic pressure is supplied by any conventional pressurized source, not shown. The source is connected to fittings 26 and 27 at opposite ends of the cylinder 25. In particular, when positive pressure, on the order of 40 psi, is applied to fitting 26, the carriage 24 moves to the right (as shown in FIG. 1). Conversely, when positive pneumatic pressure is applied to fitting 27, the carriage moves to the left (as shown in FIG. 1). The speed of the movement is also regulated, at least in part, by the controlled restriction of air flow applied at the respective fittings.

The pistonless cylinder 25 (along with its related fittings) is mounted between end brackets 29 and 30 by threaded caps 31 and 32 or the like. The end brackets 29 and 30 are mounted on a support bracket 33 by suitable bolts, screws, rivets or the like. The support bracket 33 is adapted to be mounted to an apparatus such as, but not limited to, a printed circuit board drilling machine (not shown) which utilizes the stack pusher assembly 75.

In the embodiment shown, the mounting bracket 33 is in the form of an angle bracket, but other configurations can be utilized. Also, the bracket 33 and the end brackets 29 and 30 can form a unitary assembly if desired.

Carriage bracket 42 is connected to carriage 24 by screws 52. Screws 45 are used to connect carriage bracket 42 to the traveling bracket 44 (see FIG. 2) which, therefore, moves horizontally along with carriage 24.

A pair of limit switches are mounted on the mounting bracket 33. In this embodiment, limit switch 34 is mounted at the left end of the mounting bracket 33 (see FIGS. 1 and 2). Limit switch 35 is mounted at the right end of mounting bracket 33 (see FIG. 2). The limit switches 34 and 35 are used to limit the travel of traveling bracket 44, carriage 24, and the pusher apparatus connected thereto. Of course, other mounting arrangements can be made for the limit switches 34 and 35. Moreover, the limit switches 34 and 35 can be omitted altogether in some embodiments.

In the embodiment described herein, the traveling bracket 23 (shown in the extended or operative position in FIG. 1) has the idler pulleys 36 and 37 mounted thereon. The cables 38 and 39 pass around the pulleys 36 and 37, respectively. In particular, the ends of cable 38 are connected to the rod end bracket 17 and to the cable mounting bracket 40 which is, typically, one end of the support bracket 33. Similarly, cable 39 has the ends thereof connected to support bracket 20 and the cable mounting bracket 41 which is, typically, the opposite end of the support bracket 33. The cable system is provided, in this instance, to permit the disk rod 13 (and the disks 14 thereon) to move twice as far as the traveling bracket 23. The cable system can provide other multiples of horizontal movement, or it can be eliminated, if so desired.

The traveling bracket 23 is slidably mounted to traveling sliding bracket 44 (see FIG. 2) to permit vertical motion thereof. As noted supra, the system illustrated in FIG. 1 shows the traveling bracket 23 in the extended or downward position. This is, as will be seen infra, the operative or "pushing" position. When the system 75 is in the inoperative position, the traveling bracket 23 is raised upwardly to disengage from the workpiece. In this position, the pulleys 36 and 37 are disposed behind the carriage bracket 42 which is joined to the pistonless carriage 24. In this condition, the cables take the configuration shown by the dashed lines 28A and 39A. (The lower portions of the cables follow the rod 13 and disks 14 upwardly.) Any slack in the cable is taken up by spring 43.

As shown best in FIG. 2, the traveling sliding support 44 has a, generally, pentagonal shape although other shapes can be readily utilized. The sliding support 44 is connected to the flange 42 by the screws 45 (see FIG. 1). The support shaft 22 is connected to the disk rod 13 by rod end bracket 17 and support bracket 20. The support shaft 22 provides additional structural strength to disk rod 13 as may be required.

The mounting platform 47 comprises an enlarged portion or, in this embodiment, a separate support mechanism attached to support shaft 22. The mounting platform 47 and, thus, support shaft 22, is attached to the traveling bracket 23 by screws 28 (as seen best in FIG. 3).

As shown in FIG. 2, a suitable guide mechanism 48 is provided to control traveling bracket 23. This mechanism includes a suitable guide rail 46 mounted on the surface of slide support 44. A guideway (see FIG. 3) is provided on the back of traveling bracket 23. The guide mechanism 48 defines the vertical travel path of traveling carriage 23 as described infra.

Referring now to FIG. 3, there is shown a back view of the suppport assembly 50 and the stack pusher assembly 75 together with a first work station 100 and a second work station 200. The support assembly 50 and the pusher assembly 75 are the same assemblies described supra. Thus, rod 13 supports a plurality of disks 14. The rod 13 is supported by the support shaft 22 and the end mounting arrangements including brackets 17 and 20 as described above. In addition, mounting platform 47 is mounted to traveling bracket 23 by screws 28. The pulleys 36 and 37 are shown in dashed outline. The cables 38 and 39 are connected to the unit, as described above, and pass around the pulleys.

A pneumatic piston 52 is mounted to the surface of traveling bracket 23 by flange 53. That is, flange 53 is mounted to bracket 23 by screws 54 and the piston 52 is mounted to the flange. The piston 53 includes fittings 55 and 56 which are adapted to be connected to a suitable pneumatic source (not shown).

The piston rod 57 is connected to sliding support 44, for example by nut 58. Thus, when fluid pressure on the order of 35 psi is applied to the fittings 55, the piston cylinder 52 is moved upwardly or downwardly relative to sliding support 44. Inasmuch as bracket 23 is connected to support shaft 22 which is connected to rod 13, movement of bracket 23 also raises or lowers rod 13 and the disks 14 thereon. Thus,the disks are selectively placed into (or removed from) engagement with workpiece 10.

As noted relative to FIG. 2, a guide rail 46 is mounted on the back surface of traveling bracket 44. A mating guideway or groove is formed in the rear surface of bracket 23. The guide rail is retained with the guideway in a slidable fashion. Thus, the guide rail 46 and guideway maintain the vertical movement path of the bracket 23. As shown in FIG. 3, the piston rod 57 has been driven into the piston cylinder 52 wherein the support bracket 23 is located at the upward position. Thus, the disks 14 are displaced above the work station 100. In this instance, the workpiece 10 is disengaged relative to the disks.

Also shown in FIG. 3 is the horizontal guide rail 59 which is mounted on the back of the support 30 by a plurality of screws 60. A mating guideway or groove is provided in the back surface of traveling bracket 44. The guide rail 59 and guideway operate to define and constrain the horizontal movement of the slide support 44 and the other components connected thereto.

The micro switches 35 and 36 are mounted on the support bracket 30 adjacent to the path of movement of the slide support assembly. The switches, effectively, define the ends or limits of the movement of the bracket 44 and the related assembly. That is, when switch 35 or 36 is activated by contact with the slider 44 assembly,the pneumatic source connected to the fitting 26 and 27 is deactivated. Thus, no further driving force is applied to the carriage 24 and the slider assembly stops. When carriage 24 stops, the disk pusher assembly stops and the workpiece 10 is now placed where desired. Of course, the placement and/or the type of limit switch is a matter of design preference.

Work station 200 is, typically, a shelf or storage place for mounting and storing the workpiece 10. Work station 100, which can be a drilling station or the like, is disposed adjacent to and level with work station 200. Typically, this is accomplished by moving a handling unit such as a conveyor, a cart, or the like (not shown) into close proximity with the apparatus which includes the work station 200.

A workpiece 10 is mounted on the surface 102 of the work station 100. The workpiece 10 is to be selectively moved from work station 100 to work station 200 and into the position shown in dashed outline which represents work piece 10A on surface 202. (The reverse operation is contemplated, as well.)

In the particular embodiment herein disclosed, the workpiece 10 comprises a stack of printed circuit boards or the like. In this instance, there are shown five (5) such circuit boards. Of course, the invention is not limited to circuit boards, or for that matter, to planar units which are to be moved.

Nevertheless, in the embodiment shown, the planar items, i.e. circuit boards, are joined together by registration pins 11 and 12 which are passed through the circuit boards in conventional manner to cause the circuit boards to be mounted together in a preferred registration and as a common workpiece. The registration pins 11 and 12 effectively become a portion of the workpiece 10 which is moved by the pusher assembly 75 and extend downwardly below the stack 10 to provide registration for the stack 10 in the respective work stations.

A groove 101 is shown in dashed outline in work station 100. A groove 201 is shown in dashed outline in work station 200. Typically, grooves 101 and 201 are arranged in linear alignment to assist in the transfer of the workpiece from one work station to the other. The grooves receive the pins 11 and 12 which extend below the workpiece 10.

Referring now to FIG. 4, there is shown a view of the invention which is similar to the view shown in FIG. 3. However, in FIG. 4, the vertical piston cylinder 52 has been released (or driven) whereby piston rod 57 extends out of the piston cylinder 52. This forces (or allows) the disk pusher assembly to move downwardly into contact with the workpiece 10. At least some of the disks 14 engage the workpiece whereby the workpiece can be moved by the slider assembly.

Referring now to FIG. 5, there is shown a cross-sectional view of a portion of the instant invention taken along the lines 5—5 in FIG. 4. In FIG. 5, the workpiece 10 is shown mounted at work station 100 (or, alternatively, at work station 200). A mounting pin 12 is shown extending through the workpiece 10. The pin 12 is shown depending into the channel 101 in the workstation 100. By using registration pins 12, the workpiece 10 is maintained in general registration with the overall apparatus at both the first and second work stations.

The pusher assembly comprising rod 13 and disks 14 together with support bracket 17 and support shaft 22 is shown. In particular, some of the disks 13 are shown resting on workpiece 10 while other disks 13 are shown displaced downwardly. These downwardly displaced disks rest upon rod 13 as described above. In addition, the downwardly displaced disks engage a side of the workpiece 10 whereby the workpiece is moved thereby when the pusher assembly is moved as described above.

Referring now to FIG. 6, there is shown a fragmentary view of one end of the assembly comprising the disks 14 on rod 13. In particular, rod 13 is threadedly engaged with support bracket 17. Nut 15 is threadedly engaged with rod 13 and assists in the secure positioning thereof relative to bracket 17. Washer 16 is, typically, a metal washer which acts as an end retaining component for the disk stack.

As shown best in FIGS. 6, the assembly comprising washers 14 and rod 13 has been moved downwardly on top of the workpiece 10, as shown in FIGS. 4. The bottoms of the washers 14 are placed in engagement with the surface of workpiece 10 wherever the washers 14 overlie the workpiece 10. Conversely, where the washers 14 do not overlie the workpiece, the washers are pulled downwardly, via gravitational forces, until the upper edge of the rod 13 engages and supports the inner surface of the aperture through the washers 14. Thus, as shown in FIG. 6, the lower portion of the washers 14 which have not engaged the upper surface of the workpiece 10 extend below the upper surface the workpiece 10 and engage the side edge or surface of the workpiece 10.

Clearly, the amount of overlap or engagement of the washers vis-a-vis the top portion of the workpiece 10, is a function of the diameter of the rod 13 and the central opening of the washer. Thus, if greater gripping or overlapping of the washers vis-a-vis the workpiece 10 is desired, a thinner rod or a larger washer and central opening therein, can be utilized.

It should be noted, of course, that the representation in FIGS. 6 is an idealized representation where the washers 14 are properly aligned with the edge of the workpiece 10. However, Obviously, if the alignment is not quite so true, the washers 14 will be displaced from the edge of the workpiece by as much as the width of a washer 14. In most instances, the washers are rather thin, e.g. ⅛ inch thick, so as to not provide a significant problem. Moreover, in most instances, the pushing assembly 75 is not a precise device and merely moves the workpiece from one place to another where it is subsequently registered, if registration is required.

Moreover, while the washers 14 shown and described herein above are generally considered to be circular in configuration, it is clear that the washers could have any other shape to accommodate various applications, if so desired. The only limitation is that the washers have sufficient weight and freedom of movement to drop freely below the upper surface of the workpiece and engage the upper surface of the rod. Of course, the washers must be fabricated of a material which has sufficient strength and durability to perform the tasks repeatedly.

Referring now to FIG. 7, there is shown a perspective view of the invention. This Figure omits the workpiece and work station for convenience.

In FIGS. 7, the slider assembly is shown with the piston rod 57 extended wherein the disk assembly is in the downward position. The guide rail 46 is shown engaging a guide plate 60 which is attached to the bracket 44. This is an alternative to having a guide slot or groove in the bracket 44. As suggested by arrows 61 and 62, the horizontal movement of the disk rod assembly and the vertical movement of the traveling bracket assembly are indicated.

Thus, there is shown and described a unique design and concept of a pusher assembly. The particular configuration shown and described herein relates to a preferred embodiment thereof. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limited only by the claims appended hereto.

We claim:

1. An apparatus for moving objects comprising,
   a support means,
   a plurality of elements mounted on said support means so that said elements are individually capable of movement normal to said support means,
   each of said elements comprises a disk-like unit with an aperture therethrough, and
   stop means mounted on said support means to retain said plurality of elements therebetween.

2. The apparatus recited in claim 1 wherein,
   said support means comprises an elongated rod.

3. The apparatus recited in claim 1 wherein,
   said stop means includes a selectively movable device for applying force to said plurality of elements to thereby force said elements tightly together to inhibit movement thereof.

4. The apparatus recited in claim 1 including,
   transport means connected to said support means to selectively move said support means.

5. The apparatus recited in claim 3 wherein,
   said selectively movable device includes a pneumatically activated clamp.

6. The apparatus recited in claim 4 wherein,
   said transport means selectively moves said support means in a horizontal direction.

7. The apparatus recited in claim 6 wherein,
   said transport means selectively moves said support means in a vertical direction.

8. The apparatus recited in claim 4 including,
   mounting means for mounting said transport means to a work station.

9. The apparatus recited in claim 1 wherein,
   said elements comprise plastic washers.

10. The apparatus recited in claim 2 wherein,
    said support means includes an elongated bar mounted in parallel with said elongated rod.

11. The apparatus recited in claim 9, wherein,
    said plastic washers have a central aperture with a radius which is approximately equal to the diameter of said elongated rod.

12. The apparatus recited in claim 8 including,
    pulley means mounted on said transport means, and
    cable means connected to said mounting means and said transport means,
    said cable means passes around said pulley means to provide an increased distance of movement by said support means relative to said transport means.

13. An apparatus for moving objects comprising,
    support means,
    a plurality of elements mounted on said support means so that said elements are individually capable of movement normal to said support means,
    stop means mounted on said support means to retain said plurality of elements therebetween, and
    transport means connected to said support means to selectively move said support means,
    said transport means includes a pistonless cylinder.

14. The apparatus recited in claim 13 wherein,
    said transport means includes a traveler mechanism which is moved by said pistonless cylinder,
    said traveler mechanism is attached to said support means.

15. The apparatus recited in claim 14 wherein,
    said traveler means includes a piston which is attached to said support means and selectively moves said support means in a vertical direction.

16. The apparatus recited in claim 15 wherein,
    said piston is a pneumatically operated piston.

17. A pusher apparatus including,
    an elongated rod,
    a plurality of washers mounted on said elongated rod,
    a fixed stop at one end of said elongated rod, and
    a pneumatically activated clamp which is selectively activated to press said plurality of washers close together to effectively limit the movement of said washers on said rod.

18. The apparatus recited in claim 17 including,
    transport means connected to said elongated rod to selectively move said support means in a horizontal direction and in a vertical direction.

19. The apparatus recited in claim 18 including,
    pulley means mounted on said transport means, and
    cable means connected to pass around said pulley means to provide an increased distance of movement by said elongated rod relative to said transport means.

20. The apparatus recited in claim 18 including,
    said transport means includes a pistonless cylinder,
    said transport means includes a traveler mechanism which is moved by said pistonless cylinder, and
    said traveler mechanism is attached to said elongated rod and selectively moves said elongated rod in a vertical direction.

* * * * *